United States Patent Office 3,074,779
Patented Jan. 22, 1963

3,074,779
PURIFICATION OF HYDROGEN CHLORIDE GAS CONTAINING HYDROGEN FLUORIDE IMPURITY
James Paterson Quin, Widnes, England, assignor to Imperial Chemical Industries Limited, London, England, a corporation of Great Britain
No Drawing. Filed July 24, 1961, Ser. No. 125,978
Claims priority, application Great Britain Aug. 5, 1960
1 Claim. (Cl. 23—154)

This invention relates to the removal from gaseous mixtures comprising hydrogen chloride of hydrogen fluoride impurity by absorption of the latter with silica gel.

Sources of hydrogen chloride gas containing hydrogen fluoride as impurity exist which can be condensed to give liquid hydrogen chloride. However, the latter still contains the hydrogen fluoride impurity and this is found undesirable in some cases.

It is known that if said impure hydrogen chloride is brought into intimate contact at substantially normal atmospheric pressure with silica gel the hydrogen fluoride is converted to silicon tetrafluoride which, however, passes out with the hydrogen chloride. It has been proposed to convert the hydrogen fluoride impurity in the hydrogen chloride to silicon tetrafluoride by means of silica gel and then to submit the exit gas containing HCl and the volatile silicon tetrafluoride to a second stage process wherein it is brought into contact with other absorbents such as boric acid suspended on silica gel which selectively absorbs the silicon tetrafluoride. Extra expense is involved in the provision of such two-stage processes and this cannot be regarded as completely satisfactory since hydrogen chloride itself is a low cost product. Other methods have been proposed which avoid the use of silica gel absorbent by absorbing the contaminated hydrogen chloride in a liquid composition consisting of sulphur trioxide and water with the consequent formation of chlorosulphonic acid. However, such a process has the disadvantage that the chlorosulphonic acid is volatile and passes out of the system with the hydrogen chloride.

I have now surprisingly found that if a gaseous mixture comprising HCl and HF is brought into intimate contact with silica gel at superatmospheric pressure silicon tetrafluoride is substantially absent from the exit gas.

According to the present invention therefore a process for the removal from gaseous mixtures comprising hydrogen chloride and hydrogen fluoride of the hydrogen fluoride impurity comprises bringing said gaseous mixture at a pressure of at least 50 p.s.i.g. into intimate contact with silica gel.

In some industrial processes there are mixtures comprising hydrogen chloride and hydrogen fluoride available at superatmospheric pressure. For example in the fluorination of halogenated hydrocarbons such as carbon tetrachloride with hydrogen fluoride in the presence of an antimony halide catalyst a crude reaction mixture of chlorofluorinated methanes, hydrogen chloride and hydrogen fluoride is obtained, wherefrom hydrogen chloride containing a small amount of hydrogen fluoride may be removed by anhydrous fractional distillation at elevated pressures. Such contaminated hydrogen chloride which is already available at superatmospheric pressure may be very conveniently purified by the process of the present invention athough contaminated hydrogen chloride at substantially normal atmospheric pressure can always be subjected to increased pressure to make it available for purification according to the process of the present invention.

The following example illustrates but does not limit the invention.

Example

A gas mixture comprising hydrogen chloride with an average hydrogen fluoride content of 600 p.p.m. at a pressure of 100 p.s.i.g. and at an approximate temperature of 15° C. was passed continuously for a period of 18 days at a rate of 2½ m.³ per hour (as measured at R.T.P.) upwardly through a 15 cm. diameter steel pipe, 75 cm. in length, with a capacity of 14 litres, packed with approximately 7.5 kg. of silica gel having a volume of approximately 10 litres.

There was no evidence of $SiF_4$ in the exit gas, the total HF content of the exit gas as determined by passing the gas into aqueous caustic soda solution and back titrating being less than 5 p.p.m.

What I claim is:

A process for the removal from gaseous mixtures comprising hydrogen chloride and hydrogen fluoride of the hydrogen fluoride impurity which consists essentially of bringing said gaseous mixtures at a pressure of at least 50 lb. per square inch gauge into intimate contact with bed of reactant material consisting essentially of silica gel.

References Cited in the file of this patent
UNITED STATES PATENTS
2,526,776    Smith et al. ------------- Oct. 24, 1950